United States Patent [19]

Schiedat

[11] 4,099,641
[45] Jul. 11, 1978

[54] PRESSURE TANK FOR HOT-WATER HEATERS

[75] Inventor: Heinz Schiedat, Hoxter, Albaxen, Fed. Rep. of Germany

[73] Assignee: Stiebel Eltron GmbH & Co. KG, Holzminden, Fed. Rep. of Germany

[21] Appl. No.: 766,495

[22] Filed: Feb. 7, 1977

[30] Foreign Application Priority Data

Feb. 10, 1976 [DE] Fed. Rep. of Germany ....... 2605103
Dec. 2, 1976 [DE] Fed. Rep. of Germany ....... 2654585

[51] Int. Cl.² ............................................. B65D 25/18
[52] U.S. Cl. ..................................... 220/444; 220/445; 220/71
[58] Field of Search ..................... 220/3, 9 A, 9 F, 71, 220/83, 64

[56] References Cited

U.S. PATENT DOCUMENTS

| | | | |
|---|---|---|---|
| 2,281,407 | 4/1942 | Bohnsack | 220/64 X |
| 3,010,602 | 11/1961 | Randolph | 220/83 |
| 3,372,075 | 3/1968 | Holt et al. | 20/3 X |
| 3,446,385 | 5/1969 | Ponemon | 220/3 |
| 3,557,827 | 1/1971 | Marsh | 20/3 X |
| 3,815,773 | 6/1974 | Duvall et al. | 220/64 X |
| 3,860,478 | 1/1975 | Bartlow et al. | 220/9 F X |

Primary Examiner—Stephen Marcus
Attorney, Agent, or Firm—Haseltine, Lake & Waters

[57] ABSTRACT

A pressure tank, particularly for hot-water heaters, with a synthetic liner and a glass fiber wrapping reinforcing it. The glass fiber wrapping is fixed to individual positions of the liner by means of synthetic material located at these positions. At the same time, the glass fiber wrapping may be held to the liner by means of a foamed, heat-insulating synthetic layer placed around the glass fiber wrapping. The liner has stiffening caps, and the overlapping areas of the glass fiber wrapping are saturated with the synthetic material. The synthetic layer is foam-applied between a protective jacket and the wrapped liner which may have a diffusion-tight paint coating. The wrapping fibers or threads may be provided, moreover, with a water vapor diffusion-tight protective layer. The fibers may be of organic or inorganic material, and either glass fibers, glass threads or glass fiber strands may be used as the wrapping material.

10 Claims, 1 Drawing Figure

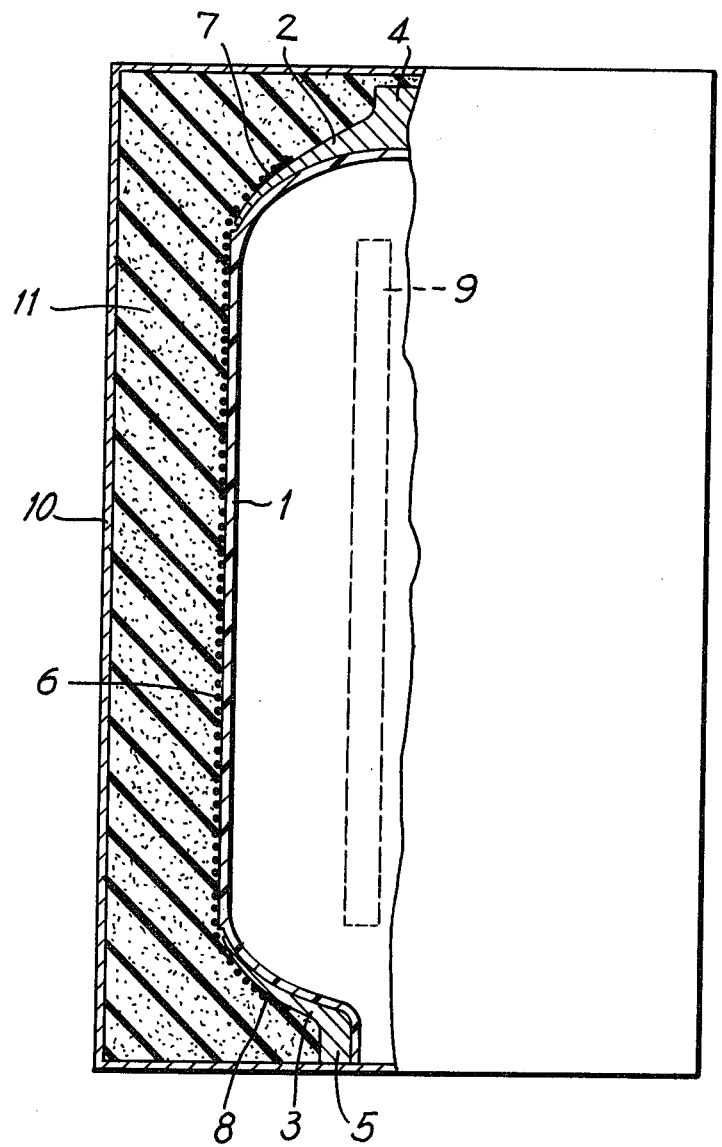

PRESSURE TANK FOR HOT-WATER HEATERS

BACKGROUND OF THE INVENTION

The present invention relates to a pressure tank, particularly for a hot-water heater, with a water-tight synthetic inner liner and a glass fiber wrapping which reinforces it. The glass fiber wrapping is fixed to individual locations on the liner by means of synthetic material located at these locations and/or is held to the liner by means of a formed synthetic layer placed around the glass fiber wrapping.

With such pressure tanks, the inner liner is conventionally made by the blowing method and as such is not suited for accomodating greater water pressures. It therefore has been proposed that the liner be wrapped with glass threads (rovings) which are synthetically saturated throughout their entire length. This results in an undesirable odor in the water used whch arises from the diffusion of the synthetic, e.g., styrol containing resin, which saturates the glass threads, and which develops during hardening in the liner. In addition, the complete saturation of the glass fiber wrap with synthetic material is expensive.

In the area where the glass fiber wrapping is not embedded in synthetic material, it tends to rot. This can be attributed to the steam diffusion which takes place through the walls of the liner. One method for preventing rotting of the glass fibers is to apply a steam tight coating to the liner. Obviously, this requires an additional operation in the manufacture of the pressure tank.

It is, therefore, an object of the present invention to provide a pressure tank of the above type where the taking on of odor by the water used is avoided and its manufacturing costs are reduced.

Another object of the present invention is to improve a pressure tank of the above type so as to eliminate rotting of the glass fiber wrapping.

A further object of the present invention is to provide a pressure tank of the foregoing character which is simple in construction and may be economically fabricated.

A still further object of the present invention is to provide a pressure tank, as described, which may be easily maintained in service and which has a substantially long service life.

SUMMARY OF THE INVENTION

The objects of the present invention are achieved by providing that the glass fiber wrapping is fixed on individual locations of the liner by means of synthetic material located at these positions and/or is held to the liner by means of a synthetic layer placed around the glass fiber wrapping and acting as heat shield. Since the glass fibers are only saturated with synthetic material at these locations, the use of synthetic material, e.g., solvent (styrol) containing resins is appreciably reduced. Simultaneously, odor formation in the water used is avoided by reducing the amount of synthetic material used. Thus, odor formation is counteracted by the spotwise insertion and noninsertion of the glass fiber wrapping in a hardening synthetic material. In addition, the amount of synthetic material required for holding the glass fiber wrapping is reduced or eliminated.

The heat insulating synthetic layer applied as foam around the glass fiber wrapping, which is a polyurethane jacket, provides protection and secure support of the glass fiber wrapping to the inside liner. In some applications, the synthetic layer, foam-applied around the glass fiber wrapping, is sufficient for fixing the glass fiber wrapping.

Since the synthetic mass, e.g., styrol-containing resin, is partially or in its entirety dispensed with, the hardening energy and time is reduced. This does not weaken the strength of the liner since this is determined by the glass fiber wrapping. In order to prevent rotting in the glass fibers from water vapor diffusion, the inside liner may be provided with vapor-tight paint coat or a water-vapor tight foil.

In another embodiment, the glass fiber wrapping has glass fibers, glass threads or stands which each by itself and/or jointly are provided with a water vapor diffusion tight protective layer. This does not eliminate the water vapor diffusion through the wall of the liner. However, it has no effect on the glass fibers or the glass fiber strands. Rubber or a rubberlike material can be used as protective layer.

The Novel features which are considered as characteristic for the invention are set forth in particular in theappended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 shows a partial section through a pressure tank, in accordance with the present invention.

DESCRIPTION OF THE PREFERRED EMBODIMENTS

A synthetic liner 1 on its spherically curved ends mounts stiffening caps 2 and 3. They are formed from aluminum parts. They have attachments 4 and 5 by means of which the liner can be clamped into a wrapping machine. The connecting elements such as water intake, water discharge and heating element pass through the attachment 5.

The inside liner 1 with the stiffening caps 2 and 3 is wrapped in glass fibers 6. The glass fiber wrapping 6 overlaps the stiffening caps 2 and 3. The glass fibers are saturated with synthetic material only at few spots, for example in areas 7 and 8 of the stiffening caps and in a zone 9. Zone 9 holds the glass fiber ends of one wrapping of that part of the liner which is between the stiffening caps 2 and 3. In zones 7 and 8 are the ends of an additional cross wrapping of the liner and the stiffening caps; this wrapping is intertwined with the aforementioned wrapping.

The wrapped liner 1 is inserted in a protective jacket. The free space between protective jacket 10 and inside liner 1 or glass fiber wrapping 6 is filled with a heat insulating hard foam material 11, for example polyurethane. The glass fiber wrapping is thus held to the liner and protected against external influences.

It is possible within the scope of the present invention to locate the spots where the glass fiber wrapping is saturated with synthetic material in areas suitable to the type of wrapping. If the synthetic-saturated areas are located on the aluminum stiffening caps, a diffusing of the synthetic material to the liner is prevented from the outset and thus odor formation in the used water attributed to the diffusion of the synthetic material to the liner is eliminated.

When using glass fiber material coated with rubber or a rubber-like material, it is of advantage that this material does not diffuse through the wall of the liner, so that odor formation attributable to it is eliminated from the outset.

It is obvious that the invention is not restricted to the impregnation of glass fibers, glass fiber strands and glass threads, but is applicable to all other diffusion-prone wrapping materials of organic or inorganic origin, for example carbon fibers, etc.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalents of the following claims.

What is claimed is:

1. A pressure tank, particularly for hot water heaters, comprising: a synthetic liner; a glass fiber wrapping reinforcing said liner; and synthetic material means only at predetermined locations of said liner for fixing said glass fiber wrapping to said liner only at said predetermined locations.

2. A pressure tank, particularly for hot water heaters, comprising: a synthetic liner; a glass fiber wrapping reinforcing said liner; synthetic material means only at predetermined locations of said liner for fixing said glass fiber wrapping to said liner only at said predetermined locations; and a synthetic foamed, heat-insulating layer around said glass fiber wrapping for holding said wrapping to said liner.

3. A pressure tank as defined in claim 2 including stiffening caps on said liner, said glass fiber wrapping having over-lapping areas saturated with synthetic material.

4. A pressure tank as defined in claim 2 including a protective jacket, said synthetic layer being foam-applied between said protective jacket and said wrapped liner.

5. A pressure tank as defined in claim 2 including a diffusion-tight paint coating.

6. A pressure tank as defined in claim 2 wherein said glass fiber wrapping has fiber-shaped elements forming said wrapping; and water vapor diffusion tight layer means on said fiber-shaped elements.

7. A pressure tank as defined in claim 6 wherein said diffusion-tight layer means is hardened and applied on said fiber-shaped elements prior to forming said wrapping.

8. A pressure tank as defined in claim 2 wherein said glass fiber wrapping is formed of fiber-shaped elements of organic material.

9. A pressure tank as defined in claim 2 wherein said glass fiber wrapping has fiber-shaped elements comprised of inorganic material.

10. A pressure tank as defined in claim 2 wherein said glass fiber wrapping is formed of elongated glass fiber-shaped elements.

* * * * *